(12) United States Patent
Björkqvist et al.

(10) Patent No.: US 12,124,802 B2
(45) Date of Patent: Oct. 22, 2024

(54) SYSTEM AND METHOD FOR ANALYZING SIMILARITY OF NATURAL LANGUAGE DATA

(71) Applicant: IPRally Technologies Oy, Helsinki (FI)

(72) Inventors: Sebastian Björkqvist, Helsinki (FI); Juho Kallio, Helsinki (FI)

(73) Assignee: IPRally Technologies Oy, Helsinki (FI)

( * ) Notice: Subject to any disclaimer, the term of this patent is extended or adjusted under 35 U.S.C. 154(b) by 245 days.

(21) Appl. No.: 17/611,204

(22) PCT Filed: Apr. 11, 2020

(86) PCT No.: PCT/FI2020/050238
§ 371 (c)(1),
(2) Date: Nov. 15, 2021

(87) PCT Pub. No.: WO2020/234508
PCT Pub. Date: Nov. 26, 2020

(65) Prior Publication Data
US 2022/0207240 A1    Jun. 30, 2022

(30) Foreign Application Priority Data

May 18, 2019   (FI) ..................................... 20195411

(51) Int. Cl.
*G06F 40/289* (2020.01)
*G06F 3/0484* (2022.01)
(Continued)

(52) U.S. Cl.
CPC .......... *G06F 40/289* (2020.01); *G06F 3/0484* (2013.01); *G06F 40/253* (2020.01); *G06N 3/045* (2023.01); *G06N 3/084* (2013.01); *G06F 40/205* (2020.01); *G06F 40/284* (2020.01); *G06F 40/30* (2020.01); *G06Q 50/184* (2013.01)

(58) Field of Classification Search
CPC .... G06F 40/289; G06F 3/0484; G06F 40/253; G06F 40/205; G06F 40/284; G06F 40/30; G06N 3/045; G06N 3/084; G06Q 50/184
See application file for complete search history.

(56) References Cited

U.S. PATENT DOCUMENTS 10,902,210 B2 *   1/2021   Arvela ..................... G06F 40/30
11,393,141 B1 *   7/2022   Hsu ......................... G06N 5/025
(Continued)

FOREIGN PATENT DOCUMENTS

CN           107015963 A      8/2017

*Primary Examiner* — Abul K Azad
(74) *Attorney, Agent, or Firm* — Laine IP Oy (57) ABSTRACT

The invention provides a system and method for analyzing similarity of natural language data. The system comprises a neural network subsystem adapted for reading graph format input data comprising a plurality of nodes having node values, and a similarity estimation subsystem utilizing the neural network subsystem and being trained for estimating similarity of a first and a second graphs, the similarity estimation subsystem being capable of producing at least one similarity value. In addition, there is provided a similarity explainability subsystem adapted to calculate importance values for a plurality of nodes or subgraphs of the second graph, which are used to create a reduced second graph indicate sub-blocks of the second block of natural language.

16 Claims, 9 Drawing Sheets

(51) Int. Cl.
    *G06F 40/253*     (2020.01)
    *G06N 3/045*     (2023.01)
    *G06N 3/084*     (2023.01)
    G06F 40/205     (2020.01)
    G06F 40/284     (2020.01)
    G06F 40/30     (2020.01)
    G06Q 50/18     (2012.01)

(56) References Cited

U.S. PATENT DOCUMENTS

| | | | |
|---|---|---|---|
| 11,741,316 B2* | 8/2023 | Galitsky | G06F 40/44 |
| | | | 704/9 |
| 2008/0187165 A1 | 8/2008 | Kao et al. | |
| 2013/0036112 A1* | 2/2013 | Poon | G06Q 50/01 |
| | | | 707/723 |
| 2014/0101171 A1* | 4/2014 | Danielyan | G06F 40/284 |
| | | | 707/E17.058 |
| 2018/0365229 A1 | 12/2018 | Buhrmann et al. | |
| 2019/0057145 A1 | 2/2019 | Huang et al. | |
| 2021/0397790 A1* | 12/2021 | Arvela | G06F 40/284 |
| 2022/0207343 A1* | 6/2022 | Lei | G06N 3/08 |

* cited by examiner

[0012] The primary objective of the present invention is to provide an earphone set including an earphone and a hanger capable of rotation about two axes for properly hanging the earphone on a user's ear.

[0013] According to the present invention, an earphone set includes an earphone and a hanger. The earphone includes a shell and a shaft extending from the shaft. The hanger includes a bushing, a connector and a hook. The bushing is mounted on the shaft. The connector includes an annular portion mounted on the bushing. The bushing cannot be rotated in the annular portion just because of a torque derived from the weight of the earphone. However, when additionally subjected to a proper torque, the bushing can be rotated in the annular portion. The hook is rotationally connected to the connector.

[0014] Other objectives, advantages and features of the present invention will become apparent from the following description referring to the attached drawings.

SYSTEM AND METHOD FOR ANALYZING SIMILARITY OF NATURAL LANGUAGE DATA

FIELD OF THE INVENTION

The invention relates to natural language processing. In particular, the invention relates to analyzing technical information expressed in natural language. The invention can is particular be used in connection with machine learning based natural language processing systems, such as search engines and/or document comparison systems. The invention suits for processing, visualization and computerized analysis technical documents or scientific documents. In particular, the documents can be patent documents.

BACKGROUND OF THE INVENTION

Comparison of written technical concepts is needed in many areas of business, industry, economy and culture. A concrete example is the examination of patent applications, in which one aim is to determine if a technical concept defined in a claim of a patent application semantically covers another technical concept defined in another document.

Currently, there are an increasing number of search tools available for finding individual documents, but analysis and comparison of concepts disclosed by the documents is still largely manual work, involving human deduction on the meaning of words, sentences and larger entities of language.

Scientific study around natural language processing has produced tools for parsing language automatically by computers. These tools can be used e.g. to tokenize text, part-of-speech tagging, entity recognition and identifying dependencies between words or entities.

Scientific work has also been done to analyze patents automatically, for example for text summarization and technology trend analysis purposes by extracting key concepts from the documents.

Recently, word embedding using multidimensional word vectors have become important tools for mapping the meaning of words into numeric computer processable form. This approach can be used by neural networks, such as recurrent neural network, for providing computers a deeper understanding of the content of documents. These approaches have proved powerful e.g. in machine translation applications.

Patent documents are analyzed for novelty or validity evaluation purposes typically by comparing features of a claim of one patent or patent application with respect to drawings or text features of another technical document. This analysis is still largely manual work and very difficult and slow in particular when features contained only in the text portion of the other documents are to be recognized and analyzed.

Moreover, current semantic search systems e.g. for patent data suffer from very poor explainability of the search results. Thus, the algorithms used therein are typically "black boxes" which do not give particular reasons as to why they have ended up suggesting a particular document as being relevant for the search input.

There is a need for improved techniques for analysis of technical data, in particular text data, such as comparing the of technical content of two or more documents or explaining the relevance of a particular document, for example for patent novelty or validity evaluation purposes.

SUMMARY OF THE INVENTION

It is an aim of the invention to solve at least some of the abovementioned problems and to provide a novel system and method for facilitating analysis of natural language documents. A specific aim is to provide a solution that helps to quicker identify similarities and differences between two blocks of natural language, such as a claim of one patent document and the contents of another patent document.

A particular aim is to provide a method and system that can be used in connection with modern machine learning based document search systems and methods.

A specific aim is to provide a method and system that can be used to explain, i.e. give reasons, for machine learning based search hits, and, optionally, to the visualize the reasons for the user of the system. One aim is to provide a method and system for improving explainability of machine learning based patent novelty search and/or novelty evaluation systems.

According to one aspect, there is provided a neural network based system for analyzing similarity of natural language data arranged in a graph format, the system comprising a neural network subsystem adapted for reading graph format input data comprising a plurality of nodes having node values, and a similarity estimation subsystem utilizing the neural network subsystem and being trained for estimating similarity of a first and a second graphs, the similarity estimation subsystem being capable of producing at least one similarity value. In addition, there is provided a similarity explainability subsystem arranged in functional connection with the similarity estimation subsystem. The similarity explainability subsystem is adapted to calculate importance values for a plurality of nodes or subgraphs of the second graph, the importance values depending on the node values and graph structures of the first and second graphs, and create a reduced second graph by dropping nodes or subgraphs of the second graph based on the importance values.

In another aspect, there is provided a neural network based system for analyzing similarity of natural language data arranged in a graph format, the system comprising a neural network subsystem adapted for reading graph format input data comprising a plurality of nodes having node values, a graph conversion subsystem adapted to convert a first and second block of natural language into first and second graphs, respectively, a similarity estimation subsystem utilizing the neural network subsystem and being trained for estimating similarity of a first and a second graphs, the similarity estimation subsystem being capable of producing at least one similarity value and a similarity explainability subsystem arranged in functional connection with the similarity estimation subsystem and adapted to calculate importance values for a plurality of nodes or subgraphs of the second graph, the importance values depending on the node values and graph structures of the first and second graphs, the similarity estimation subsystem being further adapted to map nodes or subgraphs back to the second block of natural language based on the importance values.

According to one aspect, there is provided a method of computerized comparison of natural language concepts, in particular technical concepts, such as inventions and their prior art, the method comprising converting a first and second block of natural language into first and second graphs, respectively, each containing a plurality of nodes having node values derived from natural language, producing at least one similarity value descriptive of similarity of the first and a second graphs by means of at least one similarity value using a neural network adapted for reading graph format input data, calculating importance values for a plurality of nodes or subgraphs of the second graph, the importance values depending on the node values and graph structures of the first and second graphs, and forming a reduced second graph by dropping nodes or subgraphs of the second graph based on the importance values, or mapping nodes or subgraphs back to the second block of natural language based on the importance values, i.e. identifying sub-blocks of the second block that have influenced the formation of the second graph during said conversion.

The graphs can in particular be tree-form graphs having a meronym relation between node values of at least some successive nodes.

More specifically, the invention is characterized by what is stated in the independent claims.

The invention offers significant benefits. First, the invention increases the explainability of neural network based natural language similarity estimation and/or search systems. Usually such systems are not able to give reasons for their internal logic and results that they produce. Explainability is of utmost importance e.g. in very complex domains, such as in patent novelty search and evaluation, in which the rate of false search hits is still relatively high and human analysis of textual content plays a big role. By means of the invention, a human user of the system can quickly validate if a search hit produced by a search system, or generally any given document, is relevant to a claim whose novelty is being evaluated, or at least if the search system has proposed the hit on relevant grounds.

The invention also helps to understand the logic of graph neural network algorithms and models trained therewith. The invention is particularly beneficial in the case of search systems whose neural network models have been trained with real-life patent novelty citation data, since it makes visible how well the model has learned to solve the problem given.

Creating a reduced graph is beneficial to immediately identify the matching (technical) features of the graphs, and further the texts. Mapping back to the original text can be used for better understanding the context of the features in the original text and visualizing the most relevant passages therein.

Tree-form graphs having meronym and optionally hyponym and/or relation edges are particularly beneficial as they are fast and safe to modify still preserving the coherent technical and sematic logic inside the graphs.

The dependent claims are directed to selected embodiments of the invention.

In some embodiments, the similarity explainability subsystem is adapted to drop a first node or first subgraph of the second graph having a first importance value while maintaining a second node or second subgraph of the second graph having a second importance value, which is higher than the first importance value. By dropping non-important nodes first helps to see those nodes that correspond to each other most.

In some embodiments, the similarity explainability subsystem is configured to calculate the importance values by computing a plurality of similarity values between the first and second graphs with different configurations of the second graph, i.e., by leaving out distinct portions, such as nodes thereof, on at a time. Such values are sometimes referred to as Shapley values.

In some embodiments, wherein the similarity explainability subsystem is configured to calculate the importance values by calculating a saliency value for each node of the second graph based on a norm of gradients obtained from neural network model of the neural network subsystem for the nodes of the second graph. Saliency value is directly descriptive of the internal logic of the neural network model used.

In some embodiments, the similarity explainability subsystem comprises user interface unit capable of producing user interface elements containing visual representation of the graph format data for producing first user interface elements containing the first graph and a second user interface element containing the reduced second graph.

In some embodiments, the similarity explainability module operates in interaction with the similarity estimation subsystem for producing the importance values.

In some embodiments, the similarity explainability subsystem is adapted to receive user input descriptive of desired graph reduction magnitude, and to drop nodes or subgraphs of the second graph based on said reduction magnitude in addition to the importance values.

In some embodiments, node values of the graphs are vectors representing one or more words, i.e., word, or more generally, sentence vectors.

In some embodiments, the system is a patent search and/or novelty analysis system where the first graph is a claim graph formed based on an independent claim of a patent or patent application and the second graph is a specification graph formed based on at least a patent specification or part thereof.

In particular being a patent-related system, the conversion comprises arranging noun-form items of the technical concepts into said graphs according to their meronymity and/or hyponymity with respect to each other and, optionally, arranging relation items each containing multiple noun-chunks and at least one verb-form chunk.

The first block of natural language is typically a patent claim and the second block of natural language is typically a patent specification or part thereof. The similarity estimation subsystem can be trained with a plurality of first graph and second graph pairs, each pair being labeled as containing an example of relevant or non-relevant prior art relationship between the graphs.

Next, selected embodiments of the invention and advantages thereof are discussed in more details with reference to the attached drawings.

DETAILED DESCRIPTION OF EMBODIMENTS

Definitions

"Natural language unit" herein means a chunk of text or, after embedding, vector representation of a chunk of text, i.e. a sentence vector descriptive of the chunk. The chunk can be a single word or a multi-word sub-concept appearing once or more in the original text, stored in computer-readable form. The natural language units may be presented as a set of character values (known usually as "strings" in computer science) or numerically as multi-dimensional vector values, or references to such values. E.g. a bag-of-words or Recurrent Neural Network approaches can be used to produce sentence vectors.

"Block of natural language" refers to a data instance containing a linguistically meaningful combination of natural language units, for example one or more complete or incomplete sentences of a language, such as English. The block of natural language can be expressed, for example as a single string and stored in a file in a file system and/or displayed to the user via the user interface.

"Patent document" refers to the natural language content a patent application or granted patent. Patent documents are associated in the present system with a publication number that is assigned by a recognized patent authority, such as the EPO, WIPO or USPTO, or another national or regional patent office of another country or region. The term "claim" refers to the essential content of a claim, in particular an independent claim, of a patent document. The term "specification" refers to content of patent document covering at least a portion of the description of the patent document. A specification can cover also other parts of the patent document, such as the abstract or the claims. Claims and specifications are examples of blocks of natural language.

"Claim" is herein defined as a block of natural language which would be considered as a claim by the European Patent Office on the effective date of this patent application.

"Edge relation" herein may be in particular a technical relation extracted from a block and/or a semantic relation derived from using semantics of the natural language units concerned. In particular, the edge relation can be
    a meronym relation (also: meronym/holonym relation);
        meronym: X is part of Y; holonym: Y has X as part of itself; for example: "wheel" is a meronym of "car",
    a hyponym relation (also: hyponym/hypernym relation);
        hyponym: X is a subordinate of Y; hypernym: X is a superordinate of Y; example: "electric car" is a hyponym of "car", or a synonym relation: X is the same as Y.

In some embodiments, the edge relations are defined between successively nested nodes of a recursive graph, each node containing a natural language unit as node value.

Further possible technical relations include thematic relations, referring to the role that a sub-concept of a text plays with respect to one or more other sub-concepts, other than the abovementioned relations. At least some thematic relations can be defined between successively nested units. In one example, the thematic relation of a parent unit is defined in the child unit. An example of thematic relations is the role class "function". For example, the function of "handle" can be "to allow manipulation of an object". Such thematic relation can be stored as a child unit of the "handle" unit, the "function" role being associated with the child unit. A thematic relation may also be a general-purpose relation which has no predefined class (or has a general class such as "relation"), but the user may define the relation freely. For example, a general-purpose relation between a handle and a cup can be "[handle] is attached to [cup] with adhesive". Such thematic relation can be stored as a child unit of either the "handle" unit or the "cup" unit, or both, preferably with inter-reference to each other.

"Graph" or "data graph" refers to a data instance that follows a generally non-linear recursive and/or network data schema. The present system is capable of simultaneously containing several different graphs that follow the same data schema and whose data originates from and/or relates to different sources. The graph can in practice be stored in any suitable text or binary format, that allows storage of data items recursively and/or as a network. The graph is in particular a semantic and/or technical graph (describing semantic and/or technical relations between the node values), as opposed to a syntactic graph (which describing only linguistic relations between node values). The graph can be a tree-form graph. Forest form graphs including a plurality of trees are considered tree-form graphs herein. In particular, the graphs can be technical tree-form graphs.

"Data schema" refers to the rules according to which data, in particular natural language units and data associated therewith, such as information of the technical relation between the units, are organized.

"Nesting" of natural language units refers to the ability of the units to have one or more children and one or more parents, as determined by the data schema. In one example, the units can have one or more children and only a single parent. A root unit does not have a parent and leaf units do not have children. Sibling units have the same parent. "Successive nesting" refers to nesting between a parent unit and direct child unit thereof.

"Recursive" nesting of data schema refers to nesting of data schema allowing for natural language unit containing data items to be nested.

"(Natural language) token" refers to a word or word chunk in a larger block of natural language. A token may contain also metadata relating to the word or word chunk, such as the part-of-speech (POS) label or syntactic dependency tag. A "set" of natural language tokens refers in particular to tokens that can be grouped based on their text value, POS label or dependency tag, or any combination of these according to predetermined rules or fuzzy logic.

The terms "data storage unit/means", "processing unit/means" and "user interface unit/means" refer primarily to software means, i.e. computer-executable code, that are adapted to carry out the specified functions, that is, storing of digital data, allowing user to interact with the data, and processing the data, respectively. All of these components of the system can be carried in a software run by either a local computer or a web server, through a locally installed web browser, for example, supported by suitable hardware for running the software components.

Description of Selected Embodiments

Exemplary System Overview

A natural language search system employing a similarity explainability subsystem is described below. The system comprises digital data storage means for storing a plurality of blocks of natural language and data graphs corresponding to the blocks. The storage means may comprise one or more local or cloud data stores. The stores can be file based or query language based.

In one embodiment, there is provided a graph converter subsystem adapted to convert blocks of natural language to graph format. Each converted graph contains a plurality of nodes each containing as node value a natural language unit extracted from the blocks. Edges are defined between pairs of nodes, defining the technical relation between nodes. For example, the edges, or some of them, may define a meronym relation between two nodes.

In some embodiments, the number of at least some nodes containing particular natural language unit values in the graph is smaller than the number of occurrences of the particular natural language unit in the corresponding block of natural language. That is, the graph is a condensed representation of the original text, achievable for example using a token identification and matching method described later. The essential technical (and optionally semantic) content of the text can still be maintained in the graph representation by allowing a plurality of child nodes for each node. A condensed graph is also efficient to process by graph-based neural network algorithms, whereby they are able to learn the essential content of the text better and faster than from direct text representations. This approach has proven particularly powerful in comparison of technical texts, and in particular in searching patent specifications based on claims and automatic evaluation of the novelty of claims.

In some embodiments, the number of all nodes containing a particular natural language unit is one. That is, there are no duplicate nodes. While this may result in simplification of the original content of the text, at least when using tree-form graphs, it results in very efficiently processable and still relatively expressive graphs suitable for patent searches and novelty evaluations.

In some embodiments, the graphs are such condensed graphs at least for nouns and noun chunks found in the original text. In particular, the graphs can be condensed graphs for noun-valued nodes arranged according to their meronym relations. In average patent documents, many noun terms occur tens or even hundreds of times throughout the text.

By means of the present scheme, the contents of such documents can be compressed to a fraction of original space while making them more viable for machine learning.

In some embodiments, a plurality of terms occurring many times in at least one original block of natural language occur exactly once in the corresponding graph.

Condensed graph representation is also beneficial as synonyms and coreference (expressions meaning the same thing in a particular context) can be taken into account when building the graph. This results in even more condensed graphs. In some embodiments, a plurality of terms occurring in at least one original block of natural language in at least two different written forms occur exactly once in the corresponding graph.

Neural network training subsystem is provided for executing a neural network algorithm capable of travelling through the graph structure iteratively and learning both from the internal structure of the graphs and its node values, as defined by a loss function which defines a learning target together with the training data cases. The trainer typically receives as training data combinations of the graphs or augmented graphs derived therefrom, as specified by the training algorithm. The trainer outputs a trained neural network model.

In some embodiments, the storage means is further configured to store reference data linking at least some of the blocks to each other. The reference data is used by the trainer to derive the training data, i.e. to define the combinations of graphs that are used in the training either as positive or negative training cases. The learning target of the trainer is dependent on this information.

A search subsystem is also provided, which is adapted to read a fresh graph or fresh block of natural language, typically through a user interface or network interface. If needed, the block is converted to a graph in the converter unit. The search subsystem uses the trained neural network model for determining a subset of blocks of natural language (or graphs derived therefrom) based on the fresh graph.

Figure 1A:
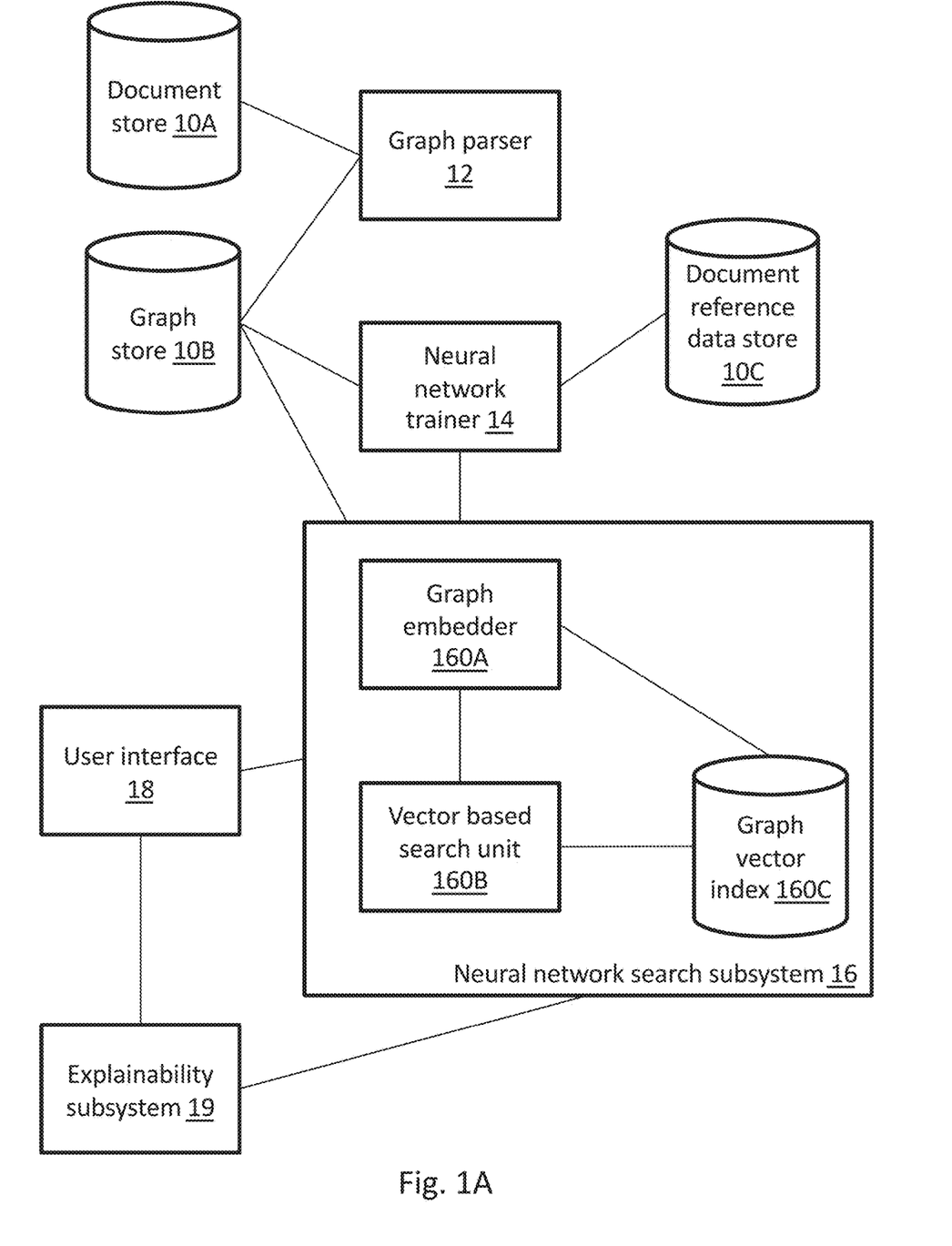
FIG. 1A shows a block diagram of a natural language search system including a similarity explainability subsystem in a general level.

FIG. 1A shows an embodiment of the present system suitable in particular for searching technical documents, such as patent documents, or scientific documents. The system comprises a document store 10A, which contains a plurality of natural language documents. A graph parser 12 which is adapted to read documents from the document store 10A and to convert them into graph format, which is discussed later in more detail. The converted graphs are stored in a graph store 10B.

The system comprises a neural network trainer unit 14, which receives as training data a set of parsed graphs from the graph store, as well as some information about their relations to each other. In this case, there is provided document reference data store 10C, including e.g. citation data and/or novelty search result regarding the documents. The trainer unit 14 run a graph-based neural network algorithm that produces a neural network model for a neural network-based search subsystem 16. The subsystem 16 uses the graphs from the graph store 10B as a target search set and user data, typically a text or graph, obtained from a user interface 18 as a reference. The search subsystem 16 may be e.g. a graph-to-vector search engine trained to find vectors corresponding to graphs of the graph store 10B closest to a vector formed from the user data. The search subsystem 16 may also be a classifier search engine, such as a binary classifier search engine, which compares pairwise the user graph, or vector derived therefrom, to graphs obtained from the graph store 10B, or vectors derived therefrom. The search subsystem 16 comprises a graph similarity evaluation subsystem that creates a similarity value for the user graph and the graphs found.

The search subsystem 16 typically comprises a graph embedding unit 160A and a vector based search unit 160B that utilizes a vector index 160C formed based on the graphs in the graph store 10B by the trained embedding unit 160A.

When one or more graphs similar to the user graph are found, they can be subjected to similarity explainability analysis carried out in explainability subsystem 19. The explainability subsystem interacts with the similarity evaluation subsystem for calculating an importance value for the nodes and/or subgraphs of the graph found and for reducing the graph found to a reduced graph containing a smaller number of nodes than the original graph found. The reduced graph can be presented in the user interface 18.

Figure 1B:
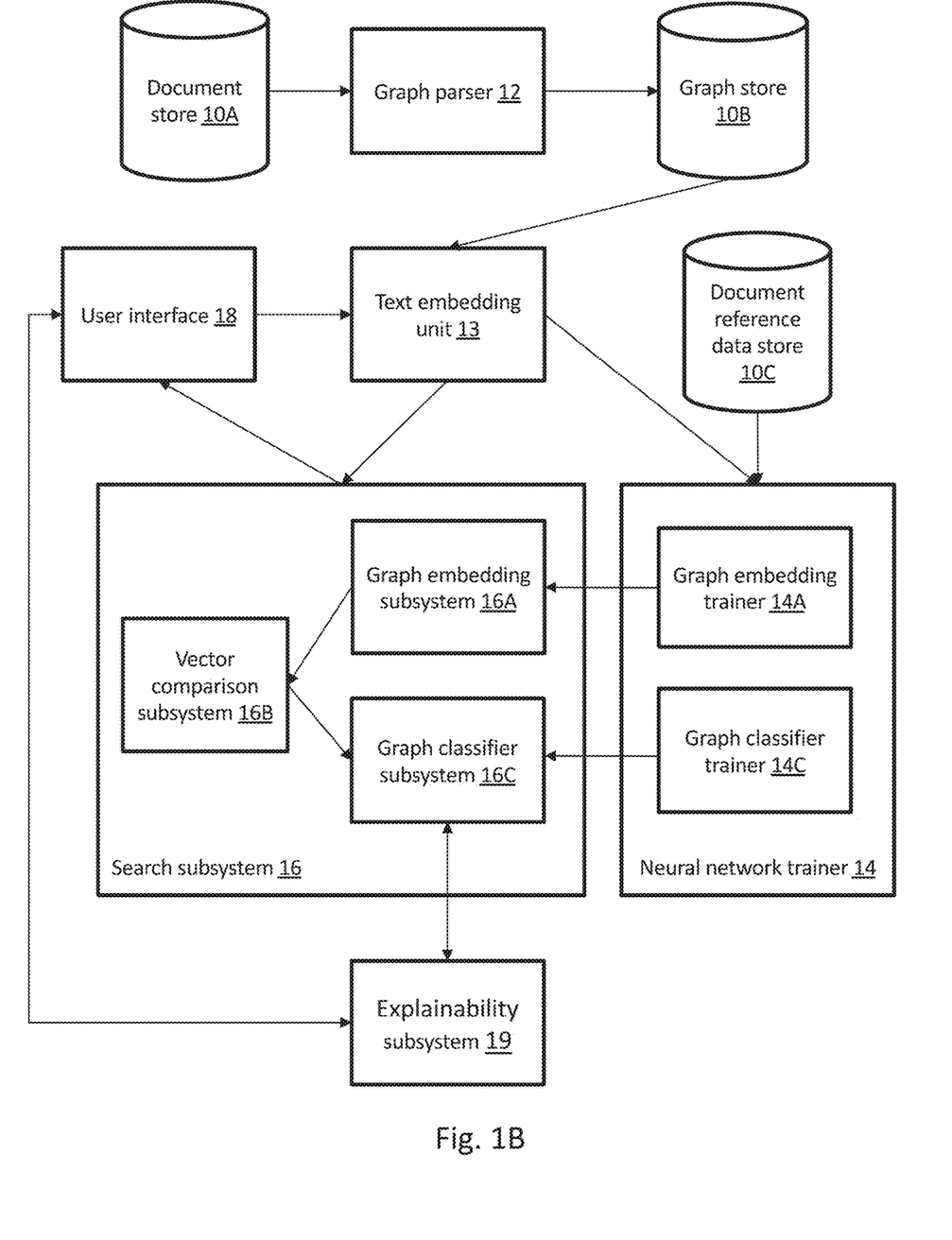
FIG. 1B shows a block diagram of a more detailed embodiment of the search system, including a pipeline of neural network-based search subsystems and their trainers.

FIG. 1B shows an embodiment of the system, further comprising a text embedding unit 13, which converts the natural language units of the graphs into multidimensional vector format. This is done for the converted graphs and from the graph store 10B and graphs entered through the user interface 18. Typically, the vectors have at least 100 dimensions, such as 300 dimensions or more.

In one embodiment also shown in FIG. 1B, the neural network search subsystem 16 is divided into two parts forming a pipeline. The subsystem 16 comprises a graph embedding subsystem that converts graphs into multidimensional vector format using a model trained by a graph embedding trainer 14A of the neural network trainer 14 using reference data from the document reference data store 10C, for example. A user graph is compared with graphs pre-produced by the graph embedding subsystem 16A in a vector comparison subsystem 16B. As a result a narrowed-down subset of graphs closest to the user graph is found. The subset of graphs is further compared by a graph classifier subsystem 16C with the user graph in order to further narrow down the set of relevant graphs. The graph classifier subsystem 16C is trained by a graph classifier trainer 14C using data from the document reference data store 10C, for example, as the training data. This embodiment is beneficial because vector comparison of pre-formed vectors by the vector comparison subsystem 16B is very fast, whereas the graph classification subsystem has access to detailed data content and structure of the graphs and can make accurate comparison of the graphs to find out differences between them. The graph embedding subsystem 16A and vector comparison subsystem 16B serve an efficient pre-filter for the graph classifier subsystem 16C, reducing the amount of data that needs to be processed by the graph classifier subsystem 16C.

The graph embedding subsystem can convert the graphs into vectors having at least 100 dimensions, preferably 200 dimensions or more and even 300 dimensions or more.

The neural network trainer 14 is split into two parts, a graph embedding and graph classifier parts, which are trained using a graph embedding trainer 14A, and graph classifier trainer 16C, respectively. The graph embedding trainer 14A forms a neural network-based graph-to-vector model, with the aim of forming nearby vectors for graphs whose textual content and internal structures are similar to each other. The graph classifier trainer 14B forms a classifier model, which is able to rank pairs of graphs according to the similarity of their textual content and internal structure.

User data obtained from the user interface 18 is fed after embedding in the embedding unit 13 to the graph embedding subsystem for vectorization, after which a vector comparison subsystem 16B finds a set of closest vectors corresponding to the graphs of the graph store 10B. The set of closest graphs is fed to graph classifier subsystem 16C, which compares them one by one with the user graph, using the trained graph classifier model in order to get accurate matches.

In some embodiments, the graph embedding subsystem 16A, as trained by the graph embedding trainer 14A, outputs vectors whose angles are the closer to each other the more similar the graphs are in terms of both node content and nodal structure, as learned from the reference data using a learning target dependent thereof. Through training, the vector angles of positive training cases (graphs depicting the same concept) derived from the reference data can be minimized whereas the vector angles of negative training cases (graphs depicting different concepts), are maximized.

In some embodiments, the graph classifier subsystem 16C, as trained by the graph classifier trainer 16C, outputs similarity values, which are the higher the more similar the compared graphs are in terms of both node content and nodal structure, as learned from the reference data using a learning target dependent thereof. Through training, the similarity values of positive training cases (graphs depicting the same concept) derived from the reference data can be maximized, whereas the similarity values of negative training cases (graphs depicting different concepts), are maximized.

Cosine similarity is one possible criterion for similarity of graphs or vectors derived therefrom.

The neural network used by the trainer 14 and search subsystem 16, or any or both sub-trainers 14A, 14C or subsystems 16A, 16C thereof, can be a recurrent neural network, in particular one utilizing Long Short-Term Memory (LSTM) units. In case of tree-structured graphs, the network can be a Tree-LSTM network, such as a Child-Sum-Tree-LSTM network. The network may have one or more LSTM layers and one or more network layers. The network may use an attention mechanism that relates the parts of the graphs internally or externally to each other while training and/or running the model.

Some further embodiments of the invention are described in the following in the context of a patent search system, whereby the documents processed are patent documents. The general embodiments and principles described above are applicable to the patent search system.

In some embodiment, the system is configured to store in the storage means natural language documents each containing a first natural language block and a second natural language block different from the first natural language block. The trainer can use a plurality of first graphs corresponding to first blocks of first documents, and for each first graph one or more second graphs at least partially based on second blocks of second documents different from the first documents, as defined by the reference data. This way, the neural network model learns from inter-relations between different parts of different documents. On the other hand, the trainer can use a plurality of first graphs corresponding to first blocks of first documents, and for each first graph a second graph at least partially based on the second block of the first document. This way, the neural network model can learn from internal relations of data within a single document. Both these learning schemes can be used either alone or together by the patent search system described in detail next.

Condensed graph representations discussed above are particularly suitable for patent search systems, i.e. for claim and specification graphs, in particular for specification graphs.

As shown in FIG. 1B, the explainability subsystem 19 can interact in particular with the classifier subsystem 16C, which is adapted to yield a similarity value for two input graphs and therefore herein serves as the similarity evaluation subsystem.

Figure 1C:
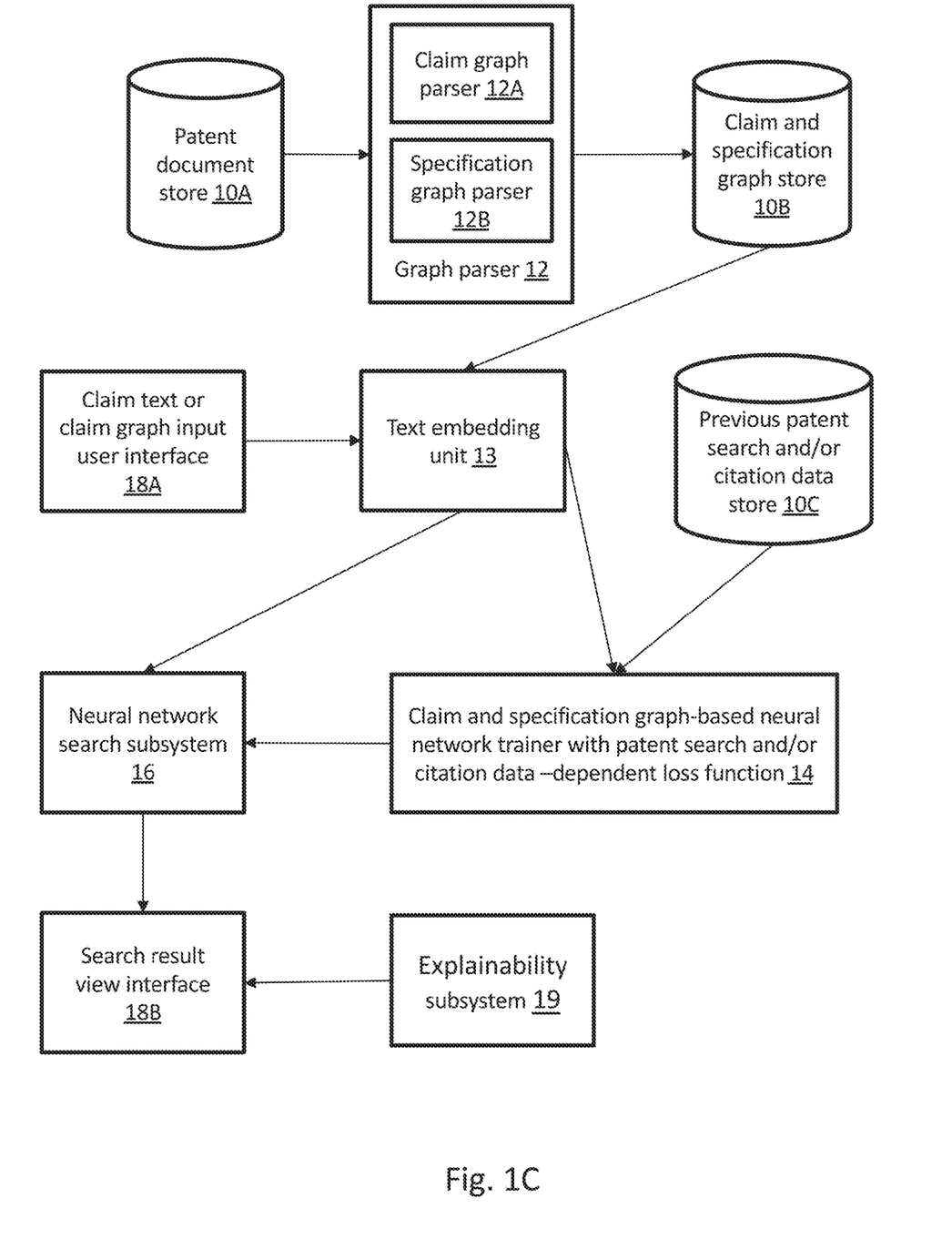
FIG. 1C shows a block diagram of an explainable patent search system according to one embodiment.

FIG. 1C shows a system comprising a patent document store 10A containing patent documents containing at least a computer-identifiable description part and claim part. The graph parser 12 is configured to parse the claims by a claim graph parser 12A and the specifications by a specification graph parser 12B. The parsed graphs are separately stored to a claim and specification graph store 10B. The text embedding unit 13 prepares the graphs for processing in a neural network.

The reference data may contain search and/or examination data of public patent applications and patents and/or citation data between patent documents. In one embodiment, the reference data contains previous patent search results, i.e. information which earlier patent documents are regarded as novelty and/or inventive step bars for later-filed patent applications. The reference data is stored in the previous patent search and/or citation data store 10C.

The neural network trainer 14 uses the parsed and embedded graphs to form a neural network model trained particularly for patent search purposes. This is achieved by using the patent search and/or citation data as an input for the trainer 14. The aim is for example to minimize vector angle or maximize similarity value between claim graphs of a patent applications and specification graphs of patent documents used as novelty bars against thereof. This way, applied to a plurality (typically hundreds of thousands or millions) of claims, the model learns to evaluate the novelty of a claim with respect to prior art. The model is used by the search subsystem 16 for user graphs obtained through the user interface 18A to find the most potential novelty bars. The results can be shown in a a search result view interface 18B.

The system of FIG. 1C can utilize a pipeline of search subsystems. The subsystems may be trained with the same or different subset of the training data obtained from the previous patent search and/or citation data store 10C. For example, one can filter a set of graphs from a full prior art data set using a graph embedding subsystem trained with a large or full reference data set, i.e. positive and negative claim/specification pairs. The filtered set of graphs is then classified against the user graph in a classification subsystem, which may be trained with a smaller, for example, patent class specific reference data set, i.e. positive and negative claim/specification pairs, in order to find out the similarity of the graphs.

Next, a tree-form graph structure applicable in particular for a patent search system, is described with reference to FIGS. 2A and 2B.

Figure 2A:
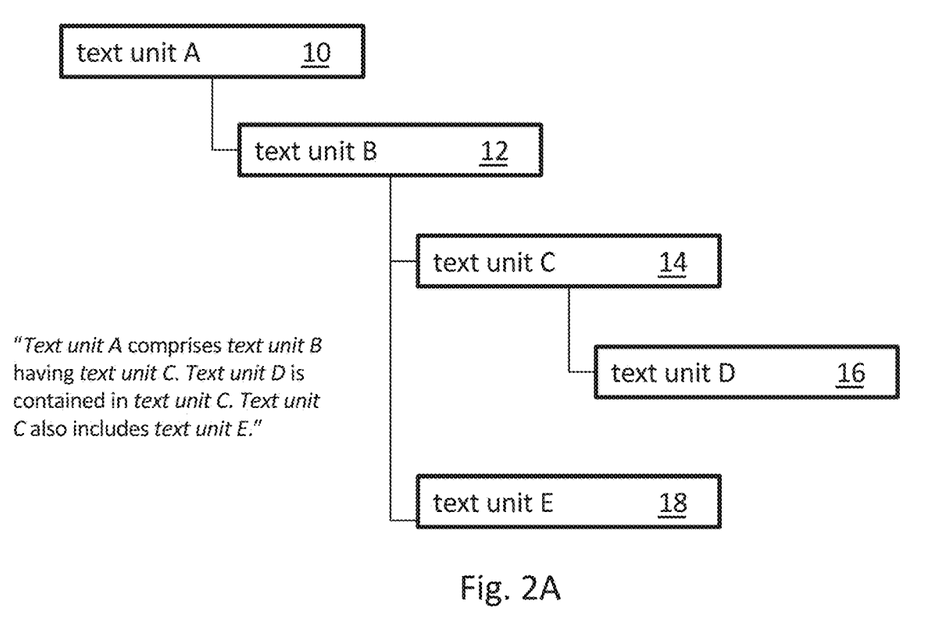
FIG. 2A shows a block diagram of an exemplary nested graph with only meronym/holonym relations.

FIG. 2A shows a tree-form graph with only meronym relations as edge relations. Text units A-D are arranged as linearly recursive nodes 10, 12, 14, 16 into the graph, stemming from the root node 10, and text unit E as a child of node 12, as a child node 18, as derived from the block of natural language shown. Herein, the meronym relations are detected from the meronym/holonym expressions "comprises", "having", "is contained in" and "includes".

Figure 2B:
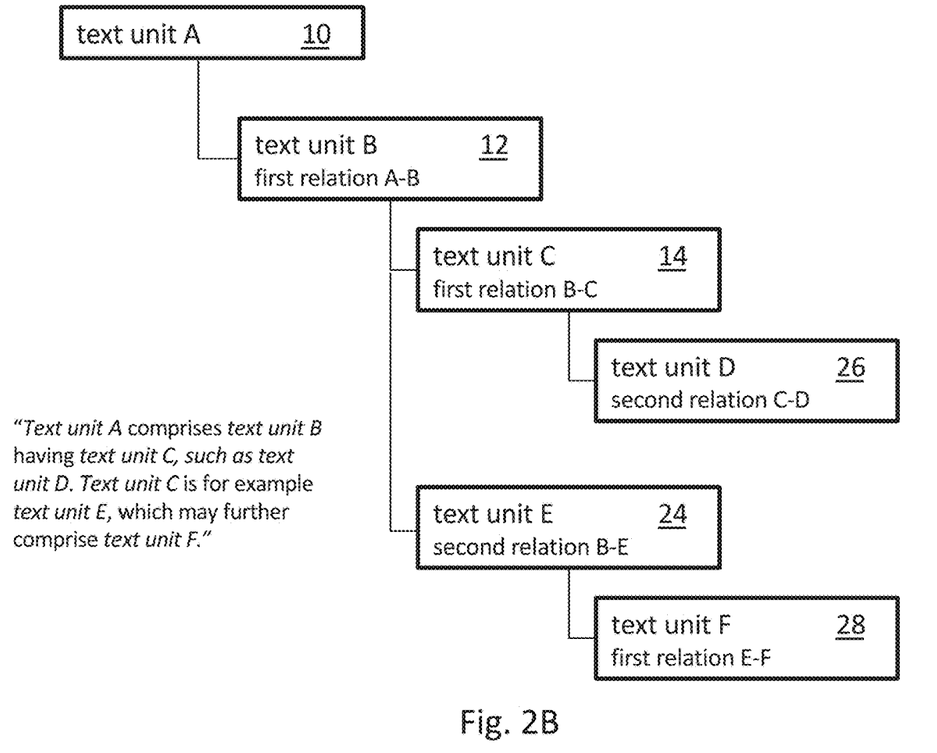
FIG. 2B shows a block diagram of an exemplary nested graph with meronym/holonym relations and hyponym/hypernym relations.

FIG. 2B shows another tree-form graph with two different edge relations, in this example meronym relations (first relation) and hyponym relations (second relation). Text units A-C are arranged as linearly recursive nodes 10, 12, 14 with meronym relation. Text unit D is arranged as a child node 26 of parent node 14 with hyponym relation. Text unit E is arranged as a child node 24 of parent node 12 with hyponym relation. Text unit F is arranged as a child node 28 of node 24 with meronym relation. Herein, the meronym and hyponym relations are detected from the meronym/holonym expressions "comprises", "having" and hyponym/hypernym expressions "such as" and "is for example".

According to one embodiment, the graph conversion subsystem is adapted to convert the blocks to graphs by first identifying from the blocks a first set of natural language tokens (e.g. nouns and noun chunks) and a second set of natural language tokens (e.g. meronym and holonym expressions) different from the first set of natural language tokens.

Then, a matcher is executed utilizing the first set of tokens and the second set of tokens for forming matched pairs of first set tokens (e.g. "body" and "member" from "body comprises member"). Finally, the first set of tokens is arranged as nodes of said graphs utilizing said matched pairs (e.g. "body"-(meronym edge)-"member").

In one embodiment, at least meronym edges are used in the graphs, whereby the respective nodes contain natural language units having a meronym relation with respect to each other, as derived from said blocks.

In one embodiment, hyponym edges are used in the graph, whereby the respective nodes contain natural language units having a hyponym relation with respect to each other, as derived from the blocks of natural language.

In one embodiment, edges are used in the graph, at least one of the respective nodes of which contain a reference to one or more nodes in the same graph and additionally at least one natural language unit derived from the respective block of natural language (e.g. "is below" [node id: X]). This way, graph space is saved and simple, e.g. tree-form, graph structure can be maintained, still allowing expressive data content in the graphs.

In some embodiments, the graphs are tree-form graphs, whose node values contain words or multi-word chunks derived from said blocks of natural language, typically utilizing parts-of-speech and syntactic dependencies of the words by the graph converting unit, or vectorized forms thereof.

Figure 3:
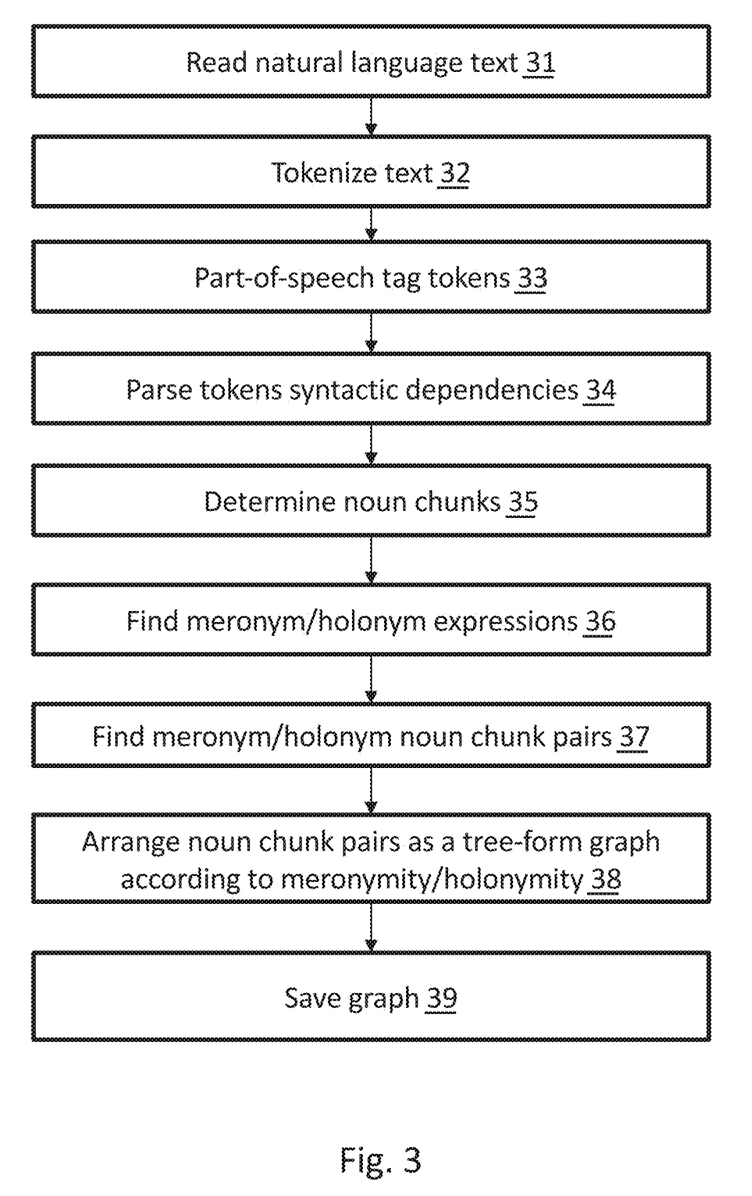
FIG. 3 shows a flow chart of an exemplary graph parsing algorithm.

FIG. 3 shows in detail an example of how the text-to-graph conversion can be carried out in the graph conversion subsystem. First, the text is read in step 31 and a first set of natural language tokens, such as nouns, and a second set of natural language tokens, such as tokens indicating meronymity or holonymity (like "comprising"), are detected from the text. This can be carried out by tokenizing the text in step 32, part-of-speech (POS) tagging the tokens 33, deriving their syntactic dependencies in step 34. Using that data, the noun chunks can be determined in step 35 and the meronym and holonym expressions in step 36. In step 37, matched pairs of noun chunks are formed utilizing the meronym and holonym expressions. The noun chunk pairs form or can be used to deduct meronym relation edges of a graph.

In one embodiment, as shown in step 38, the noun chunk pairs are arranged as a tree-form graphs, in which the meronyms are children of corresponding holonyms. The graphs can be saved in step 39 in the graph store for further use, as discussed above.

In one embodiment, the graph-forming step involves the use of a probabilistic graphical model (PGM), such as a Bayesian network, for inferring a preferred graph structure. For example, different edge probabilities of the graph can be computed according to a Bayesian model, after which the likeliest graph form is computed using the edge probabilities.

In one embodiment, the graph-forming step comprises feeding the text, typically in tokenized, POS tagged and dependency parsed form, into a neural network based technical parser, which finds relevant chunks from the block of text and extracts their desired edge relations, such as meronym relations and/or hyponym relations.

In one embodiment, the graph is a tree-form graph comprising edge relations arranged recursively according to a tree data schema, being acyclic. This allows for efficient tree-based neural network models of the recurrent or non-recurrent type to be used. An example is the Tree-LSTM model.

In another embodiment, the graph is a network graph allowing cycles, i.e. edges between branches. This has the benefit of allowing complex edge relations to be expressed.

Similarity Explainability Subsystem

The purpose of the similarity explainability subsystem 19 is to give reasoning as to why the neural network used for the similarity estimation considers two graphs as being similar (or not similar). In the presently discussed approach, this is carried out by calculating importance values for the nodes of the second graph, the importance values depending on the node values and graph structures of the first graph and the and original second graphs, and creating a reduced second graph by dropping nodes of the original second graph based on the importance values. The nodes remaining in the reduced second graph are those having the biggest contribution to the similarity value produced by the similarity estimation subsystem.

Figure 5A:
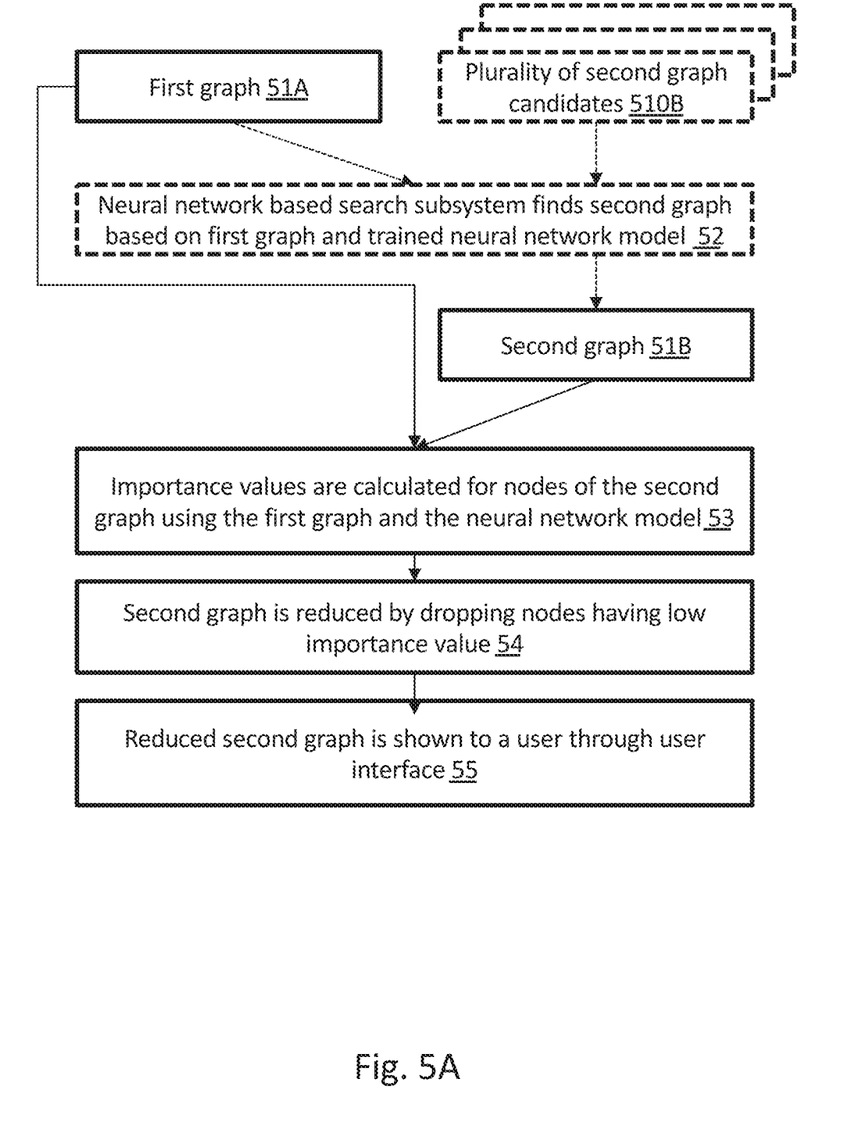
FIG. 5A shows a block diagram of a similarity explainability system according to one embodiment (graph reduction).

FIG. 5A shows the similarity explainability as a flow chart according to one embodiment capable of producing a reduced version of the second graph. The dashed blocks relate to the search step, which is used, as search step 52, to find the second graph 51B (e.g. patent specification graph) to be compared with the first graph 51A among a plurality of second graph candidates 510B. In step 53, the importance values are calculated for nodes of the second graph 51B using the first graph 51A and second graph 51B as input to the similarity estimation system based on a graph neural network model. Once the importance values are calculated, a reduced second graph is formed in step 54 by dropping at some nodes having lowest importance values, depending on a reduction factor selected. In the optional step 55, the reduced second graph is shown to the user of the system.

The reduction factor can be set by the user of the system and/or automatically determined, for example based on the number of nodes in the first graph and/or the magnitudes of the importance values.

In one example, the reduced second graph contains less than 50% of the nodes of the original second graph. In a further example, the reduced second graph contains less than 20% of the nodes of the original second graph. In one example, the reduced second graph contains at least the same number of nodes than the first graph.

Figure 5B:
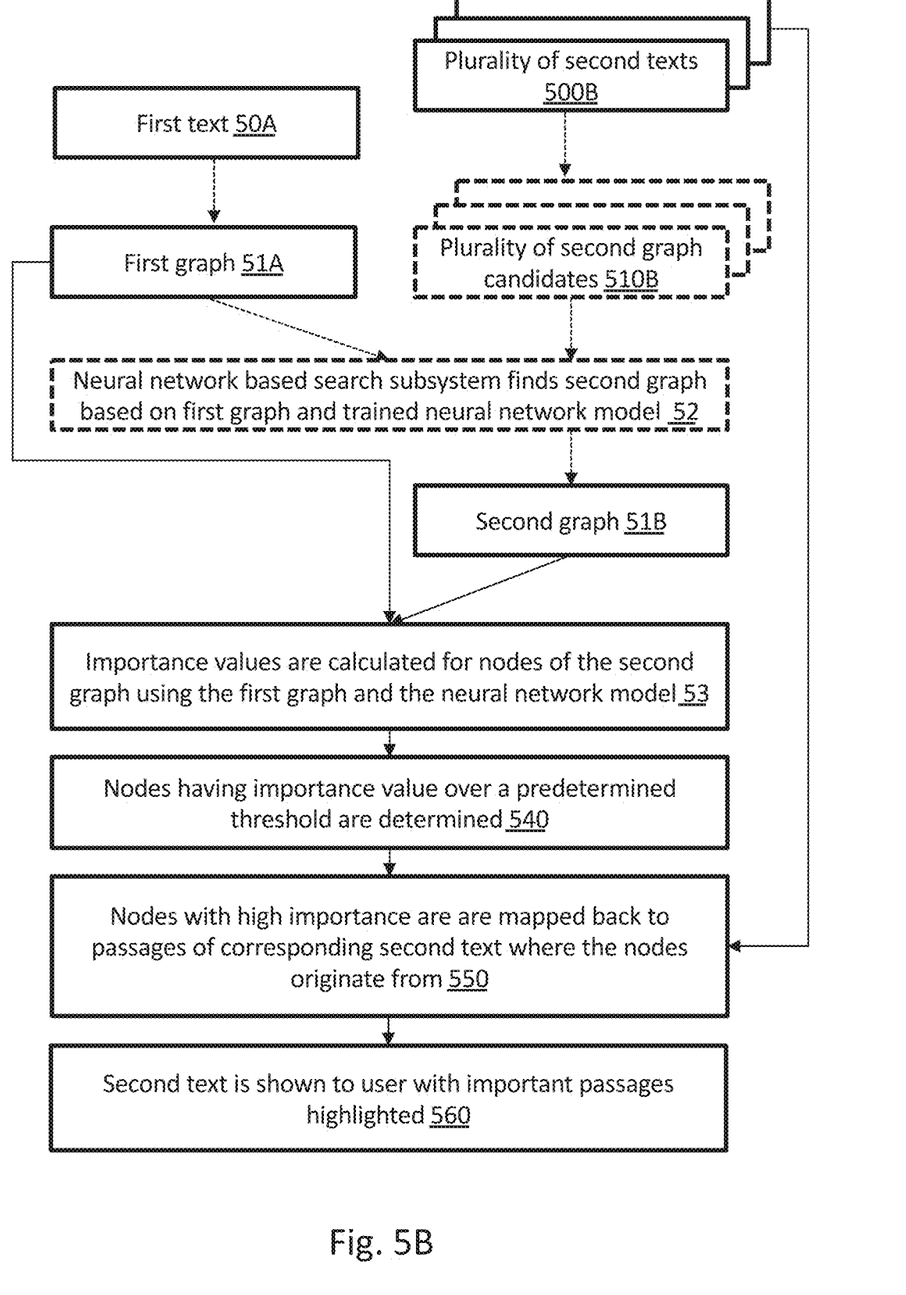
FIG. 5B shows a block diagram of a similarity explainability system according to another embodiment (mapping nodes back to original text).

FIG. 5B shows the similarity explainability as a flow chart according to another embodiment capable of indicating the relevant passages, i.e., sub-blocks of the original text. First, in steps 50A and 500B the first and second blocks are converted to graph format and the importance values for the second graph of interest are calculated. Then, in step 540 a threshold importance value is determined, as well as nodes having an importance value higher than the threshold. In step 550, those passages of the second block of natural language are determined which have influenced the generation of these nodes or subgraphs during the text-to-graph conversion. Then, these relevant passages are associated with relevance values. The relevant passages are highlighted or otherwise indicated for the user in user interface in step 560.

There may also be a plurality of different importance thresholds, corresponding to different confidence levels of the importances. The different importance thresholds can be used to provide different indications, like different color or tone highlights of different portions of the original text.

Mapping the nodes or subgraphs back to the original text can be conveniently carried out by storing information of the relevant edges, for example the meronym noun chunk pairs, of the graphs in association with the original text, when creating the graph for example as discussed with reference to FIG. 3.

In one embodiment, the importance values for the description graph nodes used in the explainability module are calculated by approximating the Shapley value for each node. The Shapley values can be approximated by leaving out one node at a time and calculating how much the similarity value produced by the similarity estimation subsystem changes when that node is left out. A large value decrease signifies an important node. The Shapley value for a node may also be approximated by modifying the sentence vector of a node to be a random or average word vector and after this calculating the value change. This also gives a measure of the importance of the node.

Another way to calculate the Shapley values that takes into account the dependencies between different nodes is to leave out larger parts, i.e., subgraphs, of the graph and calculate the value for the remaining subgraph. In one embodiment this is done by splitting the graph into two or more approximately equally sized parts and calculating the value for each part. The part with the highest value can then be split further until a subgraph of the desired size is remaining.

In another embodiment the importance values are calculated using saliency methods, i.e. by calculating a norm, for example the Euclidean norm, of the gradients for each of the node sentence vectors in the graph. This is done by first performing the forward pass for the graph in the neural network model and calculating the loss for the output value. This loss is then backpropagated through the network all the way to the sentence vectors for the nodes. Then the norms of the resulting gradients for the sentence vectors are calculated, and this gives importance values for each node. A node whose sentence vector has a large gradient norm is more important than a node whose sentence vector has a small gradient norm.

Instead of individual nodes, the above principles can be applied to subgraphs of the graphs.

The Tree-LSTM model is compatible with both the Shapley and saliency variant of the method.

Figure 4A:
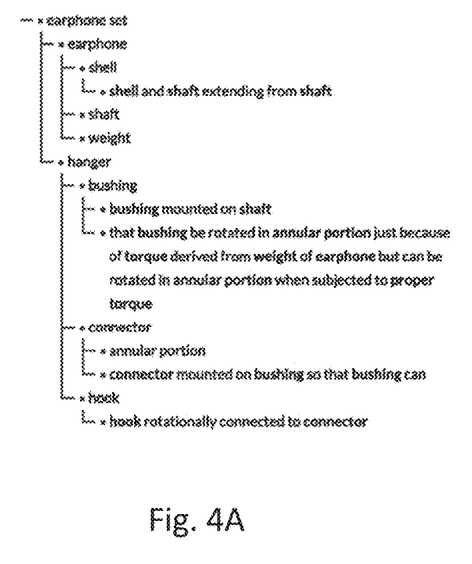
FIGS. 4A, 4B and 4C show an exemplary claim graph (first graph), a full specification graph (second graph) and a reduced specification graph (reduced second graph), respectively.
Figure 4B:
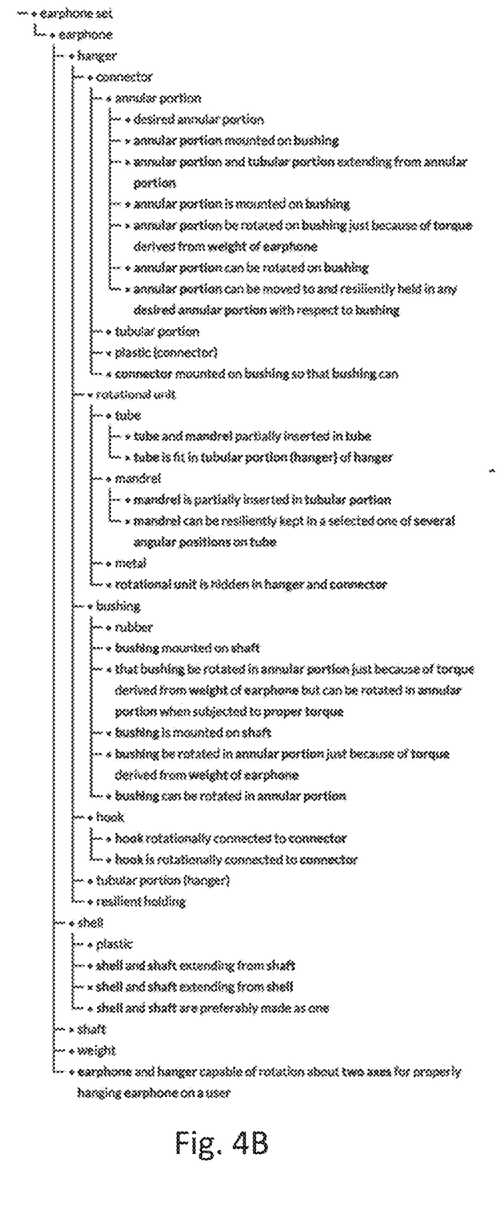
Figure 4C:
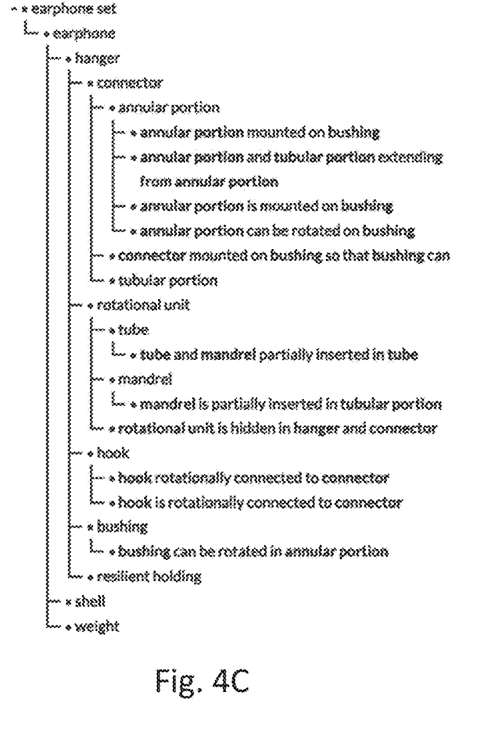

FIGS. 4A and 4B show examples of exemplary and claim and (partial) specification graphs of US 2008/0187165 A1, respectively, formed using the principles described above. FIG. 4C is a reduced specification graph formed using the saliency method. The reduction level is in this example chosen such that most of the nodes of the original specification graph, semantically and technically corresponding to the claim graph of FIG. 4A, are maintained, as well as some additional items. The dropped nodes have had less influence of the similarity evaluation between the graphs of 4A and 4B. With a higher reduction factor, the reduced specification graph would further come closer to the claim graph.

In one example, the similarity explainability subsystem contains graphical user interface means that shows that graphs and their node text values for the user, for example in a intended structure like shown in FIGS. 4A-4C. In particular, the first graph and reduced second graph can be shown simultaneously for easy human validation of the similarity of the graphs and the technical concepts they illustrate.

Figure 4D:
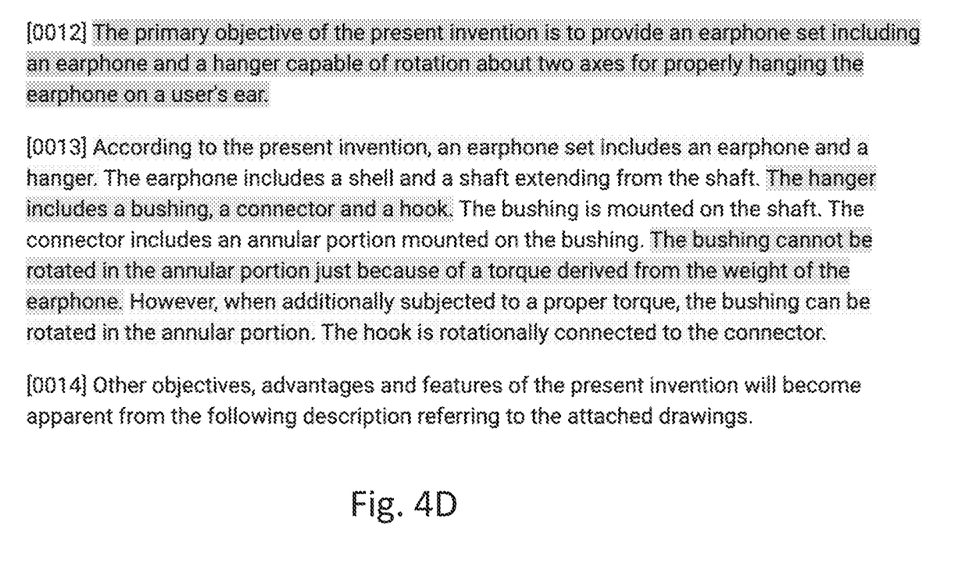
FIG. 4D shows an exemplary text passage.
Figure 4E:
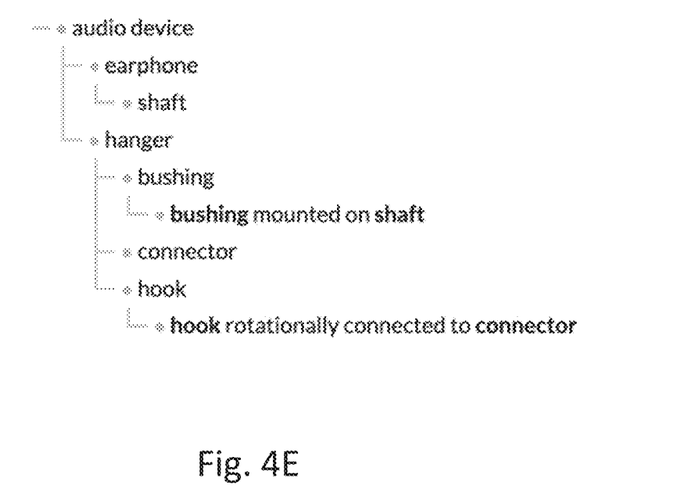
FIG. 4E shows an exemplary reference graph.

FIG. 4D shows as example of some relevant passages of the original text (portion of text from which the graphs of 4A-4C are originally generated) highlighted, for example when a first graph like that of 4E is used as the reference graph. Herein, the whole sentence is highlighted if some matching edge, as determined by the explainability subsystem, is found therein.

In one embodiment, the reduction factor is automatically determined by based on the importance values and/or number of nodes in the first graph and/or similarity value calculated based on the original second graph and/or one or more reduced second graphs.

In one embodiment, the graphical user interface contains input means allowing the user to input or affect the reduction factor.

It should be noted that although described herein as part of a search system, the present similarity explainability subsystem can be used also independently. For example, a user may manually enter a patent claim and one or more prior art documents therefor, after which the user can validate their relevance by means of the similarity explainability subsystem.

The invention claimed is:

1. A neural network based system for analyzing similarity of natural language data arranged in a graph format, the system comprising:
a neural network model reading graph format input data comprising a plurality of nodes having node values, said neural network model being trained for estimating similarity between graphs,
a graph parser converting a first and second block of natural language into a first graph and a second graphs, respectively,
wherein the system is producing, using the neural network model, at least one similarity value descriptive of the similarity between the first graph and the second graph and wherein the system is selecting one second graph based on the produced similarity value, and wherein the system is calculating importance values for a plurality of nodes or subgraphs of the selected second graph, the importance values depending on the node values and graph structures of the first graph and the selected second graphs, and wherein the system is mapping, based on the calculated importance values, nodes or subgraphs back to the second block of natural language corresponding to the selected second graph,
wherein the system is a patent novelty analysis system where the first graph is a claim graph formed based on an independent claim of a patent or patent application and the second graph is a specification graph formed based on at least a patent specification or part thereof.

2. The system according to claim 1, wherein the system is creating a reduced second graph by dropping a first node or first subgraph of the selected second graph having a first importance value while maintaining a second node or second subgraph of the selected second graph having a second importance value, which is higher than the first importance value.

3. The system according to claim 2, wherein the system is:
receiving user input descriptive of desired graph reduction magnitude, and
dropping nodes or subgraphs of the selected second graph based on said reduction magnitude in addition to the importance values.

4. The system according to claim 2, wherein the system is producing a first user interface elements containing the first graph and a second user interface element containing the reduced second graph.

5. The system according to claim 1, wherein the system is mapping, based on the calculated importance values, nodes or subgraphs back to the second block of natural language by:
determining a threshold importance value,
determining sub-blocks of the second block of natural language where the nodes or subgraphs having an importance value higher than the threshold importance value originate from during said conversion, and
associating relevance values to said sub-blocks.

6. The system according to claim 5, further comprising a user interface, wherein the system is showing said second block of natural language in text format and indicating said sub-blocks that are associated with said relevance values.

7. The system according to claim 1, wherein the system is calculating the importance values by generating a Shapley value for each node or a plurality of subgraphs of the selected second graph based on a plurality of similarity values produced by the system with different configurations of the selected second graph.

8. The system according to claim 1, wherein the system is calculating the importance values by calculating a saliency value for each node of the selected second graph based on a norm of gradients obtained from the neural network model for the nodes of the selected second graph.

9. The system according to claim 1, wherein the system is further:
performing the forward pass for the selected second graph in a neural network of the neural network model based on the first graph and calculating the loss for the output value,
backpropagating the loss through the neural network model all the way to node values of the graph, and
calculating the norms of the resulting gradients for the node values for obtaining the importance values.

10. The system according to claim 1, wherein node values of the graphs are vectors representing one or more words.

11. The system according to claim 1, wherein the first and second graphs are tree-form graphs and wherein the neural network model is a Tree-LSTM model.

12. A computer-implemented method for comparison of technical concepts expressed in natural language, the method comprising:
converting, using a graph converter subsystem, a first block of natural language into a first graphs, the first graph containing a plurality of nodes having node values derived from natural language, wherein the first block of natural language is a patent claim,
converting, using the graph converter subsystem, at least one second block of natural language into at least one second graph, the at least one second graph containing a plurality of nodes having node values derived from natural language, wherein the second block of natural language is a patent specification or part thereof,
producing, using a neural network adapted for reading graph format input data and being trained for estimating similarity between graphs, at least one similarity value descriptive of the similarity of the first and the at least one second graphs,
selecting, based on the produced similarity value, a single second graph from the at least one second graphs,
calculating importance values for a plurality of nodes or subgraphs of the selected second graph, the calculated importance values depending on the node values and graph structures of the first graph and the selected second graphs, and mapping nodes or subgraphs back to the first and/or second block of natural language based on the calculated importance values, wherein the method is carried out by a neural network based patent novelty analysis system and where the first graph is a claim graph formed based on an independent claim of a patent or patent application and the second graph is a specification graph formed based on at least a patent specification or part thereof.

13. The method according to claim 12, wherein said conversion comprises arranging noun-form items of the technical concepts into said graphs according to their meronymity and/or hyponymity with respect to each other, as inferred from the block of natural language, and, optionally, arranging relation items each containing multiple noun-chunks and at least one verb-form chunk.

14. The method according to claim 12, wherein the neural network is trained with a plurality of first graph and second graph pairs, each pair being labeled as containing an example of relevant or non-relevant prior art relationship between the graphs.

15. The method according to claim 12, wherein the neural network based system comprises:
 a neural network model reading graph format input data comprising a plurality of nodes having node values said neural network model being trained for estimating similarity between graphs,
 a graph parser converting a first and second block of natural language into first and second graphs, respectively,
wherein the system produces, using the neural network model, at least one similarity value descriptive of the similarity between the first graph and the second graph and selects one second graph based on the produced similarity value,
the system further calculating importance values for a plurality of nodes or subgraphs of the selected second graph, the importance values depending on the node values and graph structures of the first graph and the selected second graph, and mapping, based on the calculated importance values, nodes or subgraphs back to the second block of natural language corresponding to the selected second graph.

16. A computer-implemented method for comparison of technical concepts expressed in natural language, the method comprising:
 converting, using a graph converter subsystem, a first block of natural language into a first graph, the first graph containing a plurality of nodes having node values derived from natural language, wherein the first block of natural language is a patent claim,
 converting, using the graph converter subsystem, at least one second block of natural language into at least one second graph, the at least one second graph containing a plurality of nodes having node values derived from natural language, wherein the second block of natural language is a patent specification or part thereof,
 producing, using a neural network adapted for reading graph format input data and being trained for estimating similarity between graphs, at least one similarity value descriptive of the similarity of the first and the at least one second graphs,
 selecting, based on the produced similarity value, a single second graph from the at least one second graphs,
 calculating importance values for a plurality of nodes or subgraphs of the selected second graph, the calculated importance values depending on the node values and graph structures of the first graph and the selected second graph, and
 forming a reduced second graph by dropping nodes or subgraphs of the second graph based on the calculated importance values
wherein the method is carried out by a neural network based patent novelty analysis system and where the first graph is a claim graph formed based on an independent claim of a patent or patent application and the second graph is a specification graph formed based on at least a patent specification or part thereof.

* * * * *